United States Patent
Ravindran et al.

(10) Patent No.: US 12,020,733 B2
(45) Date of Patent: Jun. 25, 2024

(54) SECTOR METRICS TO ESTIMATE HEALTH OF WRITTEN DATA

(71) Applicant: Western Digital Technologies, Inc., San Jose, CA (US)

(72) Inventors: Niranjay Ravindran, Rochester, MN (US); Weldon M. Hanson, Rochester, MN (US); Hiroyasu Masuda, Fujisawa (JP); David T. Flynn, Mantorville, MN (US); Zarko Popov, Mission Viejo, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/723,263

(22) Filed: Apr. 18, 2022

(65) Prior Publication Data

US 2023/0335158 A1 Oct. 19, 2023

(51) Int. Cl.
 *G11B 5/55* (2006.01)
(52) U.S. Cl.
 CPC ............ *G11B 5/556* (2013.01); *G11B 5/5573* (2013.01); *G11B 5/5586* (2013.01)
(58) Field of Classification Search
 None
 See application file for complete search history.

(56) References Cited

U.S. PATENT DOCUMENTS

| | | | | |
|---|---|---|---|---|
| 6,747,825 B1* | 6/2004 | Ng | ..................... | G11B 20/1883 |
| 8,867,153 B1 | 10/2014 | Coker et al. | | |
| 8,953,277 B1* | 2/2015 | Wu | ..................... | G11B 20/1217 |
| | | | | 360/75 |
| 9,530,442 B1 | 12/2016 | Hassnet et al. | | |
| 9,881,643 B1* | 1/2018 | Burton | ................... | G11B 27/36 |
| 10,199,054 B1* | 2/2019 | Nichols | ............ | G11B 20/10305 |
| 10,437,674 B1 | 10/2019 | Sridhara et al. | | |
| 10,748,567 B1* | 8/2020 | Zaitsu | .............. | G11B 20/10388 |
| 11,200,911 B1* | 12/2021 | Burton | ................... | G11B 5/012 |
| 2007/0183074 A1* | 8/2007 | Smith | ................ | G11B 20/1833 |
| | | | | 360/53 |

(Continued)

OTHER PUBLICATIONS

"Shingled Magnetic Recording Disk Drive with Multiple Data Zones Containing Differentnumbers of Error-correction-code Sectors", Science On, Online available at URL: https://scienceon.kisti.re.kr/mobile/srch/selectPORSrchPatent.do?cn=USP2014048699162&dbt=USPA, 13 pages, retrieved on Nov. 29, 2021.

*Primary Examiner* — Fred Tzeng
(74) *Attorney, Agent, or Firm* — Neugeboren O'Dowd PC

(57) ABSTRACT

Various illustrative aspects are directed to a data storage device comprising data tracks N and N−1, and one or more processing devices, configured to identify, during a track write on the data track N, a write abort event based upon an expected risk for the data track N−1 exceeding a risk threshold, read one or more sectors of the data track N−1 and collect one or more corresponding sector metrics, verify the one or more sectors based upon the collected sector metrics, wherein the verifying comprises assigning each of the one or more sectors as one of a readable or a non-readable sector, and continue the track write on the data track N upon determining each of the one or more sectors is a readable sector, or recovering and relocating the data track N−1 based on determining at least one of the sectors is a non-readable sector.

22 Claims, 9 Drawing Sheets

(56) References Cited

U.S. PATENT DOCUMENTS

| | | | |
|---|---|---|---|
| 2007/0186029 A1* | 8/2007 | Uemura | G11B 20/1217 |
| 2011/0075290 A1* | 3/2011 | Hobbet | G11B 5/09 |
| 2014/0055883 A1 | 2/2014 | Dhanda et al. | |
| 2016/0148647 A1* | 5/2016 | Park | G11B 20/1889 |
| | | | 369/53.41 |
| 2016/0260457 A1* | 9/2016 | Park | G11B 20/1889 |
| 2019/0156861 A1* | 5/2019 | Burton | H03M 13/2906 |
| 2020/0007169 A1 | 1/2020 | Lamberts et al. | |
| 2020/0210277 A1* | 7/2020 | Ravindran | G11B 20/1833 |
| 2020/0251143 A1 | 8/2020 | Nangare | |
| 2020/0272339 A1* | 8/2020 | Oberg | G06F 3/0619 |
| 2022/0229761 A1* | 7/2022 | Pfitzner | G06F 11/3058 |
| 2023/0020009 A1* | 1/2023 | Nangare | G06F 3/0619 |

* cited by examiner

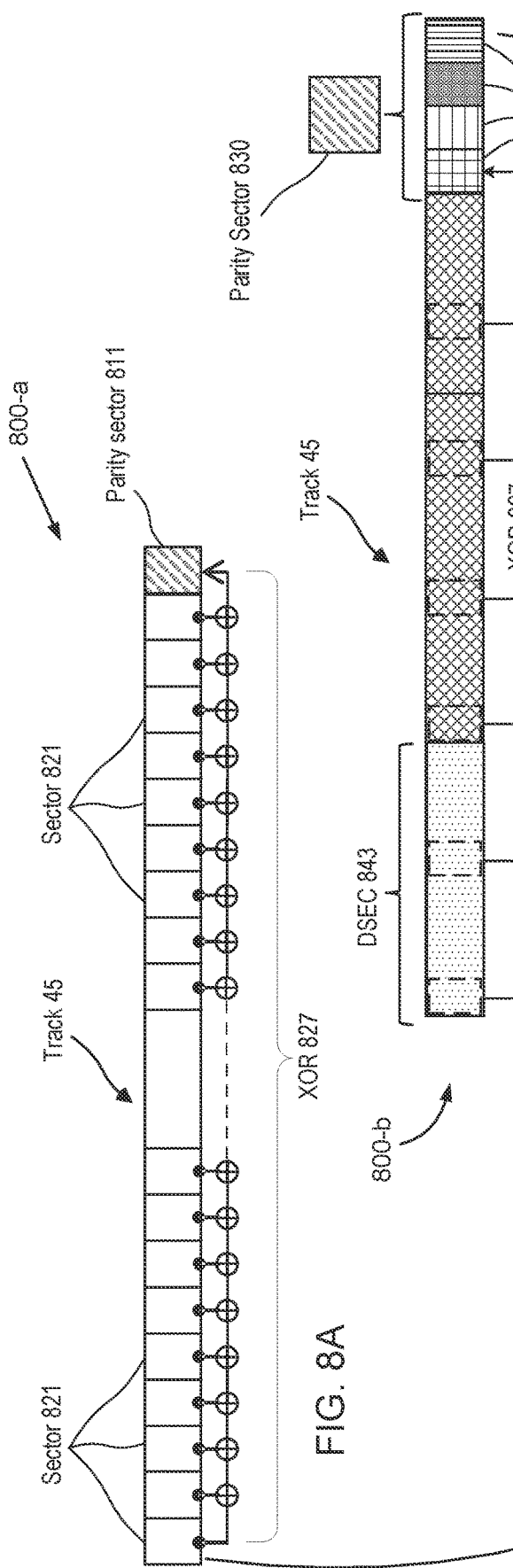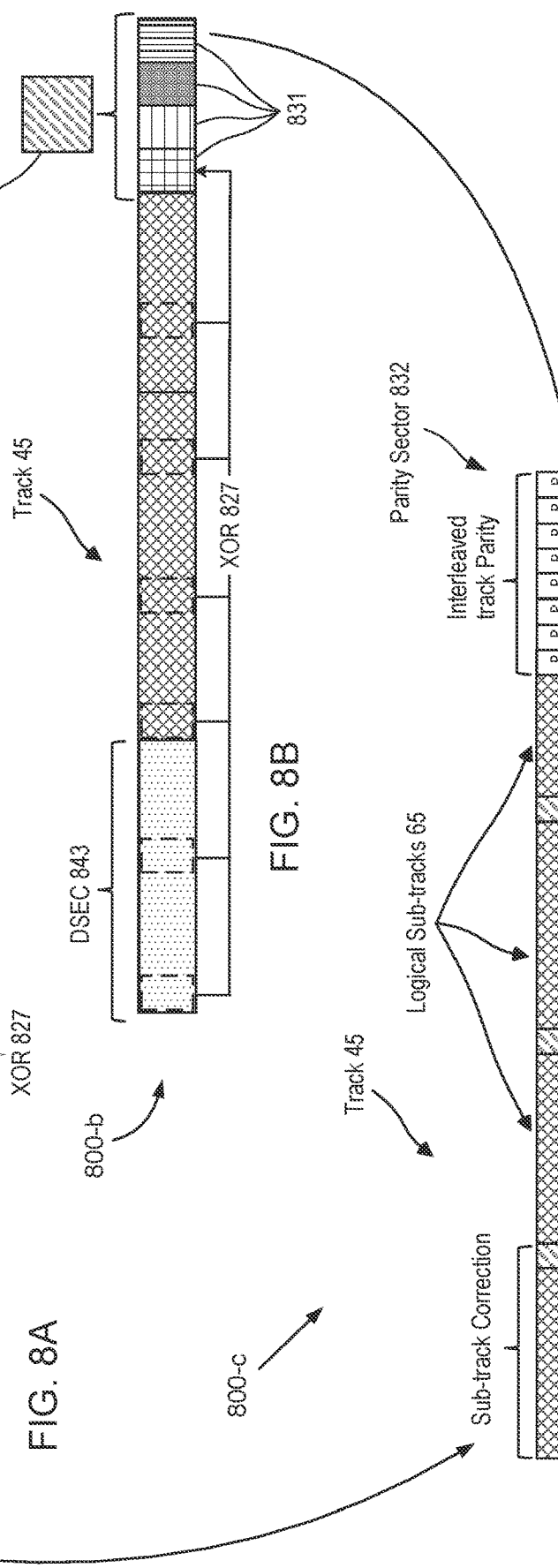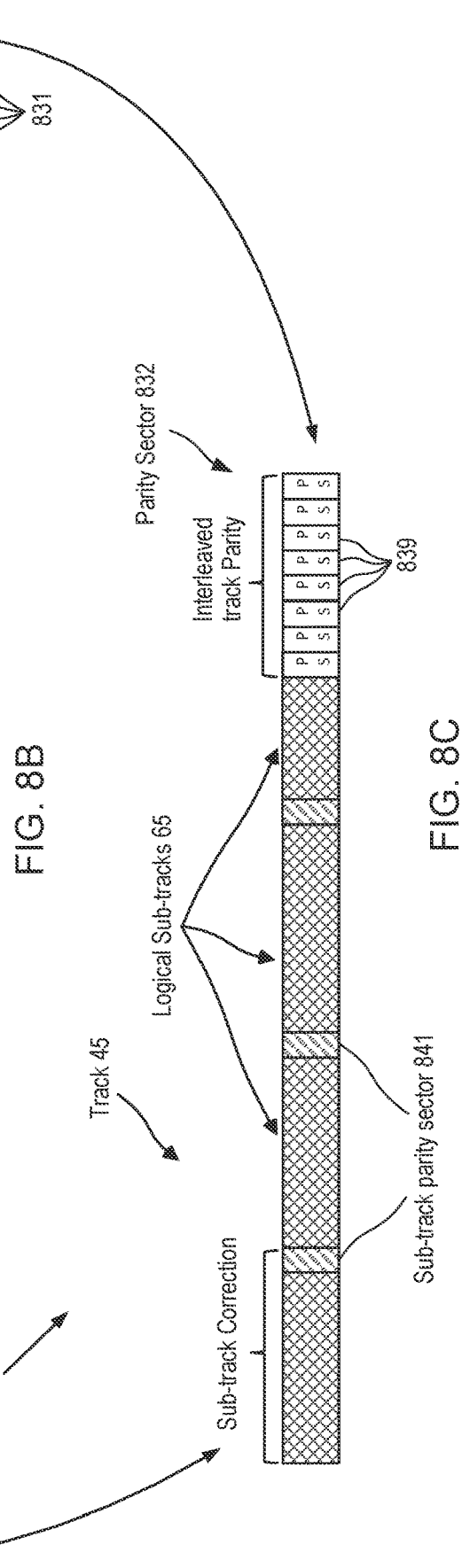

SECTOR METRICS TO ESTIMATE HEALTH OF WRITTEN DATA

BACKGROUND

Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 6. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to the one or more actuators in order to actuate the head radially over the disk in a direction that reduces the PES.

SUMMARY

The following presents a summary relating to one or more aspects and/or embodiments disclosed herein. The following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

In some circumstances, hard disk drives (HDDs) use risk values, where the risk values represent the damage to the trimmed edges of one or more data tracks or the squeeze loss of a prior data track N−1. The servo may compute the risk or the squeeze loss from the position error signal or PES during the write operation of the current data track N. Additionally, or alternatively, the servo calculates the accumulated expected damage and/or risk data for a previously written data track, which is further used for write abort decisions. To mitigate the risk of degrading previously written data, especially in SMR disk drives, prior art techniques often assume worst-case risk, which results in frequent aborts in subsequent write operations. Oftentimes, however, the risk value estimated by the servo is too "conservative", and falsely elevates the overall risk for the prior data track. While risk evaluation helps reduce write squeeze for the open edge data tracks and/or data recovery procedure (DRP) latency during data track reads, overcompensation of the risk value may lead to frequent aborts, adversely impacting HDD performance, user experience, etc.

Broadly, aspects of the disclosure serve to alleviate some of the issues seen in the prior art by enabling the HDD to (1) determine the risk for partially trimmed and verified sectors more accurately via assessment of one or more sector metrics (e.g., bit error rate or BER, squeeze loss, log-likelihood ratio or LLR, to name a few non-limiting examples) and/or (2) estimate the "health" (i.e., integrity or level of degradation) of the prior written data. In this way, the present disclosure prevents the disk drive from falsely raising the overall risk of the data track, as compared to the prior art, which also serves to reduce the probability of an abort (false alarm). Additionally, or alternatively, aspects of the present disclosure enable the sector-metric information or the "health" of the written data to be recorded for one or more disk drive operations (e.g., scheduling reads, calculating the probability of success and failure margins), which may further enhance user experience. It should be noted that, the one or more disk drive operations may or may not be directly tied to the servo write aborts.

Various illustrative aspects are directed to a data storage device comprising a disk comprising a plurality of data tracks, including a data track N and a data track N−1, a head actuated over the disk, and one or more processing devices configured to, identify, during a track write on the data track N, a write abort event based upon an expected risk for the data track N−1 exceeding a risk threshold, read the data track N−1, wherein the reading comprises reading one or more sectors of the data track N−1 and collecting one or more sector metrics for the one or more sectors, verify each of the one or more sectors based upon the one or more sector metrics, wherein the verifying comprises assigning each of the one or more sectors as one of a readable sector or a non-readable sector, and continue the track write on the data track N upon: (1) determining each of the one or more sectors is a readable sector, or (2) recovering the data track N−1 and relocating the data track N−1 based on determining at least one of the one or more sectors is a non-readable sector.

Various illustrative aspects are directed to a method of operating a data storage device, the method comprising identifying, during a track write on a data track N, a write abort event based upon an expected risk for a data track N−1 exceeding a risk threshold, reading the data track N−1, wherein the reading comprises reading one or more sectors of the data track N−1 and collecting one or more sector metrics for the one or more sectors, verifying each of the one or more sectors based upon the one or more sector metrics, wherein the verifying comprises assigning each of the one or more sectors as one of a readable sector or a non-readable sector, and continuing the track write on the data track N upon: (1) determining each of the one or more sectors is a readable sector, or (2) recovering the data track N−1 and relocating the data track N−1 based on determining at least one of the one or more sectors is a non-readable sector.

Various illustrative aspects are directed to one or more processing devices, comprising means for identifying, during a track write on a data track N, a write abort event based upon an expected risk for a data track N−1 exceeding a risk threshold, means for reading the data track N−1, wherein the reading comprises reading one or more sectors of the data track N−1 and collecting one or more sector metrics for the one or more sectors, means for verifying each of the one or more sectors based upon the one or more sector metrics, wherein the verifying comprises assigning each of the one or more sectors as one of a readable sector or a non-readable sector, and means for continuing the track write on the data track N upon: (1) determining each of the one or more sectors is a readable sector, or (2) recovering the data track N−1 and relocating the data track N−1 based on determining at least one of the one or more sectors is a non-readable sector.

Various further aspects are depicted in the accompanying figures and described below and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure and are not limiting in scope.

FIGS. 8A-8C show various examples of a data track having a plurality of data sectors and at least one parity sector, in accordance with aspects of the present disclosure.

DETAILED DESCRIPTION

Figure 1:
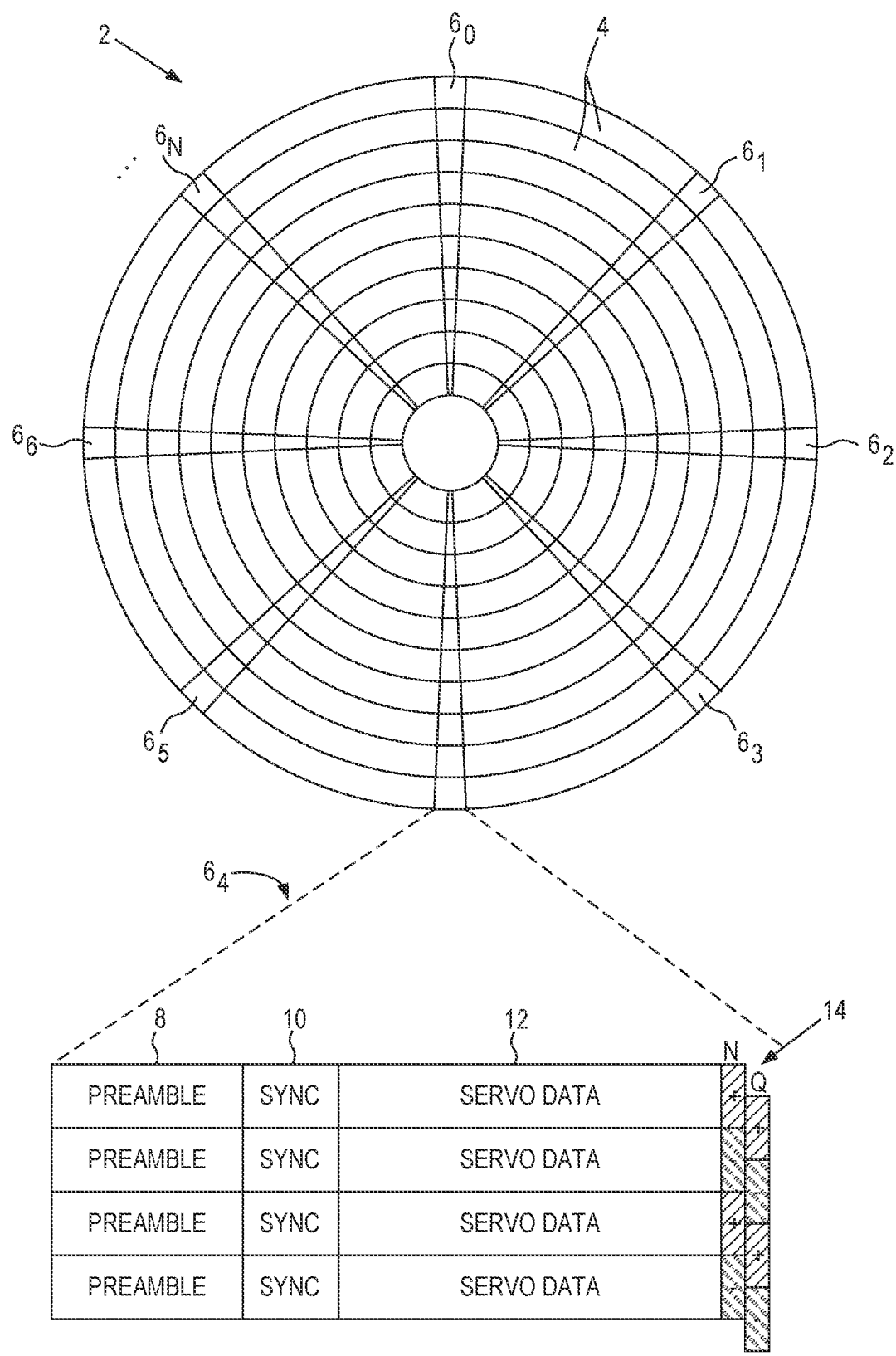
FIG. 1 shows a prior art disk format as comprising a number of radially-spaced, concentric servo tracks defined by servo wedges recorded around the circumference of each servo track.

The word "exemplary" is used herein to mean "serving as an example, instance, or illustration." Any embodiment described herein as "exemplary" is not necessarily to be construed as preferred or advantageous over other embodiments.

The embodiments described below are not intended to limit the invention to the precise form disclosed, nor are they intended to be exhaustive. Rather, the embodiment is presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

HDDs typically have disks with data tracks 45 (e.g., data tracks 45A-45E shown in FIG. 3) with a fixed track spacing or pitch, shown as track pitch 38, that is set during manufacturing and cannot be changed during the life of the HDD. The positioning of the read/write heads relative to the data tracks is accomplished by servo tracks that have angularly-spaced servo sectors that contain head positioning information. The servo sectors extend radially across the data tracks. The read head detects the positioning information as the disk rotates and passes the position information to a servo control system to maintain the head on the desired data track. The servo tracks also have a fixed track pitch that is set during manufacturing and that may be different from the fixed track pitch of the data tracks.

A read head following a particular position with respect to a servo track during writing may be subject to various disturbances, such as internal and external vibration. This may cause the write head to be off track when the data sectors are written to the data tracks. During readback, this results in a misalignment between the read head position and the position where the data track was actually written. This is true even if the read head is in its ideal position with respect to the servo track. This discrepancy between written position and the read head positioning during readback is referred to as track misregistration (TMR). TMR results in readback data errors and is a major detractor from achieving the highest possible areal densities and high throughput in modern HDDs. The data errors may possibly be recoverable in a re-read of the data, but this increases the time to retrieve the data; or they may not be recoverable, resulting in hard errors.

In some circumstances, HDD's store track misregistration (TMR) information of shingled magnetic recording (SMR) writes in dynamic-random access memory or DRAM. This information may be utilized in subsequent writes, for instance, in write feed forward to enhance TMR. Additionally, or alternatively, HDDs store risk values, where the risk values represent the damage to the trimmed edges of one or more data tracks or the squeeze loss of a previously written N−1 data track, where the squeeze loss is computed by the servo from the PES during the current write operation of the N data track. In some instances, during read, the HDD estimates the read trajectory to minimize or reduce off-track read errors, where the estimation is based on the write PES. Additionally, or alternatively, the servo calculates the accumulated expected damage and/or risk data for a previously written data track, which is further used for writing abort decisions. To address some or all of the above issues, currently used HDDs often assume worst-case risk, which results in frequent aborts in subsequent write operations. Said another way, this risk value estimated by the servo is too "conservative", and falsely elevates the overall risk for the prior data track. While risk evaluation helps reduce write squeeze for the open edge data tracks and/or reduce data recovery procedure (DRP) latency during data track reads, an overcompensation of the risk value may lead to frequent aborts, adversely impacting HDD performance, user experience, etc. Broadly, aspects of the disclosure enable the HDD to (1) determine the risk for partially trimmed and verified sectors more accurately via assessment of one or more sector metrics (e.g., bit error rate or BER, squeeze loss, log-likelihood ratio or LLR, to name a few non-limiting examples) and/or (2) estimate the "health" (i.e., integrity or level of degradation) of the written data. This written data may correspond to data written on a prior track N−1, where the prior track N−1 is adjacent and/or overlapping with the current track N. While the present disclosure is generally described in relation to shingled magnetic recording or SMR disk drives, this is not intended to be limiting. Other types of disk drives besides SMR disk drives, such as, but not limited to, two-dimensional magnetic recording (TDMR) and/or heat-assisted magnetic recording (HAMR) disk drives are contemplated in different implementations.

Figure 2:
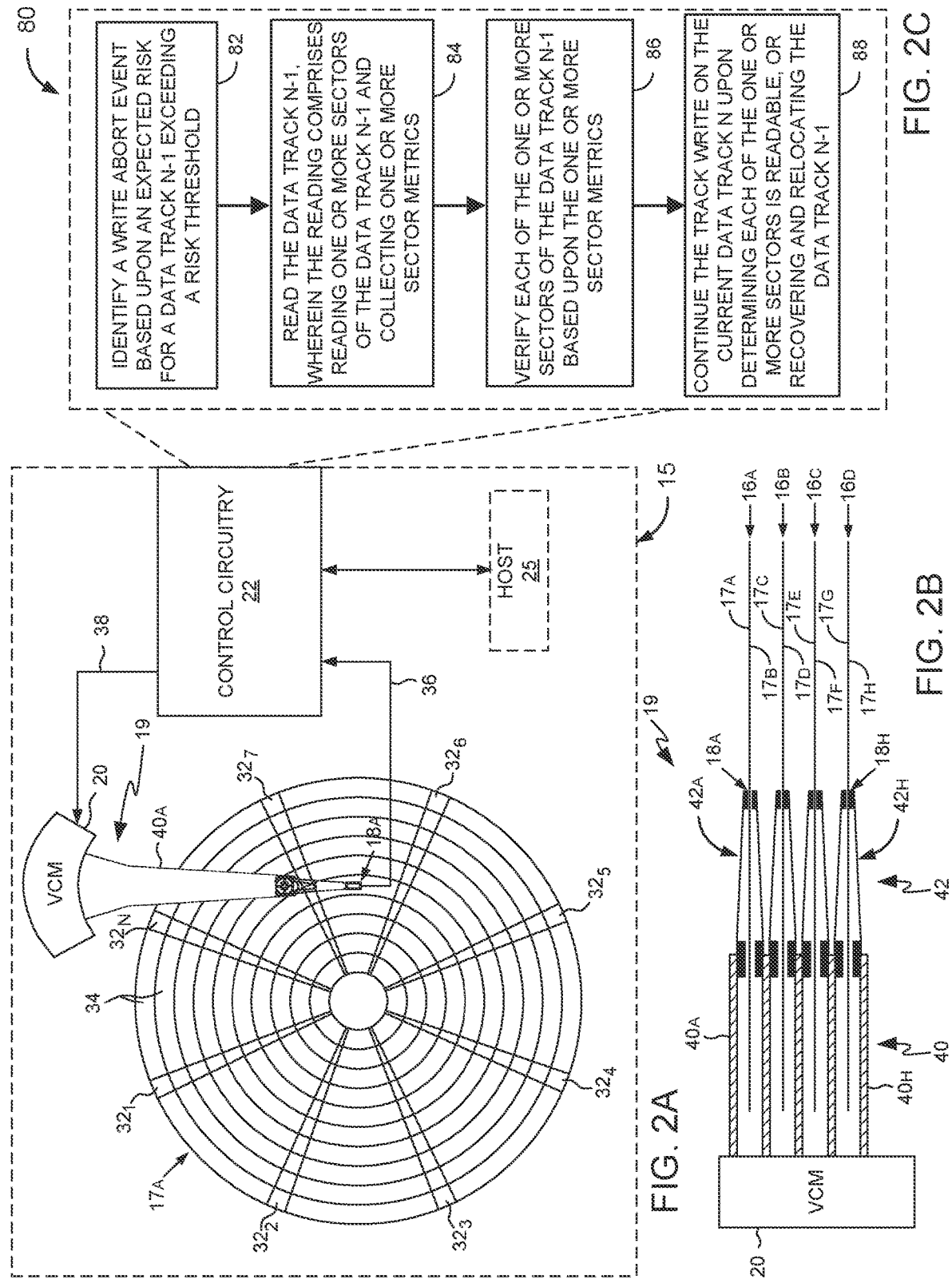
FIGS. 2A and 2B illustrate conceptual block diagrams of a top view and a side view of a data storage device in the form of a disk drive, in accordance with aspects of the present disclosure.
FIG. 2C illustrates a method that a data storage device may perform, execute, and implement, in accordance with aspects of the present disclosure.

Turning now to FIGS. 2A and 2B, which illustrate conceptual block diagrams of a top view and a side view of a data storage device in the form of a disk drive 15, in accordance with aspects of the present disclosure. Disk drive 15 comprises control circuitry 22, an actuator assembly 19, and a plurality of hard disks 16A, 16B, 16C, 16D ("hard disks 16," "disks 16"). FIG. 2C depicts a flowchart for an example method 80 that control circuitry 22 of disk drive 15 may perform or execute in controlling the operations of disk drive 15, including the operations of heads 18 (e.g., heads 18A-18H) disposed on actuator assembly 19, in accordance with aspects of the present disclosure, as further described below. Actuator assembly 19 thus comprises heads 18 and is configured to position the one or more heads 18 over disk surfaces 17 of the one or more disks 16. Heads 18 may each comprise write and read elements, configured for writing and reading control features and data to and from a corresponding disk surface 17 of hard disks 16.

Actuator assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a head 18 at a distal end thereof (e.g., example head 18A comprised in topmost actuator arm 40A, in the view of FIGS. 2A and 2B). Each of actuator arms 40 is configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Various examples may include any of a wide variety of other numbers of hard disks and disk surfaces, other numbers of actuator arm assemblies and primary actuators besides the one actuator assembly 19 and the one primary actuator 20 in the example of FIGS. 2A and 2B, and other numbers of fine actuators on each actuator arm, for example. Host 25 may be a computing device such as a desktop computer, a laptop, a server, a mobile computing device (e.g., smartphone, tablet, Netbook, to name a few non-limiting examples), or any other applicable computing device. Alternatively, host 25 may be a test computer that performs calibration and testing functions as part of the disk drive manufacturing processing.

FIG. 2A also depicts servo sectors 32 (e.g., servo sectors $32_1$ through $32_N$) written onto disk surfaces 17. In some cases, when manufacturing a disk drive, servo sectors 32 may be written to disk surfaces 17 to define a plurality of evenly-spaced, concentric tracks 34, where each of the tracks 34 comprises a track centerline (not shown). As an example, each servo sector 32 may include a phase lock loop (PLL) field, a servo sync mark (SSM) field, a track identification (TKID) field, a sector ID, and a group of servo bursts (e.g., an alternating pattern of magnetic transitions) that the servo system of the disk drive samples to align the moveable transducer head (e.g., disk head 18) with and relative to, a particular track 34. Each circumferential track 34 includes a plurality of embedded servo sectors 32 utilized in seeking and track following. The plurality of servo sectors 32 are spaced sequentially around the circumference of a circumferential track 34 and extend radially outward from the inner diameter (ID) of disk surface 17. These embedded servo sectors 32 contain servo information utilized in seeking and track following and are interspersed between data regions on disk surfaces 17. Data is conventionally written in the data regions in a plurality of discrete data sectors. Each data region is typically preceded by a servo sector 32. In the example of FIG. 2A, the control circuitry 22 processes read signals 36 emanating from the head 18A to demodulate servo data written on the disk (e.g., servo sectors 32) to generate a position error signal (PES) representing an error between the actual position of the head and a target position relative to a target track. The control circuitry 22 may process the PES using a suitable servo control system to generate a VCM control signal 38 applied to the VCM 20 which rotates the actuator arm 40 about a pivot in order to actuate the head 18 radially over the disk 16 in a direction that reduces the PES. In some examples, the disk drive may also comprise a suitable microactuator, such as a suitable piezo-electric (PZT) element for actuating the head 18 relative to a suspension 42 (e.g., topmost suspension 42A, lowest suspension 42H), or for actuating a suspension relative to the actuator arm 40. The servo sectors $32_1$-$32_N$ may comprise any suitable head position information, such as a track address for coarse positioning and servo bursts for fine positioning. The servo bursts may comprise any suitable pattern, such as an amplitude-based servo pattern or a phase-based servo pattern.

In one embodiment, the servo data (e.g., servo sectors 32) read from the disk surface 17, i.e., in order to servo the head over the disk during access operations, may be self-written to the disk using the control circuitry 22 internal to the disk drive. In some examples, a plurality of spiral servo tracks are first written to the disk surface 17, and then servo sectors 32 are written to the disk while servoing on the spiral servo tracks. In order to write the spiral servo tracks to the disk surface 17, at least one bootstrap spiral track is first written to the disk without using position feedback from servo data (i.e., the actuator or VCM 20 is controlled open loop with respect to servo data on the disk). Before writing the bootstrap spiral track, feedforward compensation is generated by evaluating a back electromotive force (BEMF) voltage generated by the VCM 20 during a calibration seek (where the BEMF voltage represents an estimated velocity of the VCM). The bootstrap spiral track is then written to the disk using the feedforward compensation.

In some examples, the control circuitry 22 is configured to execute the flow diagram 80 of FIG. 2C. At step 82, the control circuitry 22 identifies, during a track write on the data track N, a write abort event based upon an expected risk for the data track N−1 exceeding a risk threshold (e.g., shown as upper threshold $T_2$ in FIG. 5) or the expected risk being within a pre-defined range below the risk threshold (e.g., between thresholds $T_1$ and $T_2$ in FIG. 5). In some embodiments, the first and the second data tracks N−1 and N are adjacent or consecutive data tracks written using shingled magnetic recording (SMR), e.g., shown as data tracks 45A and 45B, respectively, in FIG. 3. Further, at step 84, the control circuitry 22 reads the data track N−1, wherein the reading comprises reading one or more sectors of the data track N−1 and collecting one or more sector metrics for the one or more sectors. At step 86, the control circuitry 22 is configured to verify each of the one or more sectors based upon the one or more sector metrics, wherein the verifying comprises assigning each of the one or more sectors as a readable sector or a non-readable sector. Further, at step 88, the control circuitry 22 is configured to continue the track write on the current data track N upon: (1) determining each of the one or more sectors is a readable sector, or (2) recovering the data track N−1 and relocating the data track N−1 based on determining at least one of the one or more sectors is a non-readable sector. In some examples, the control circuitry 22 is configured to retain the sector metrics information in memory (e.g., volatile or non-volatile memory), where the sector metrics information may be used for subsequent read operations (e.g., scheduling or processing of further reads).

Figure 3:
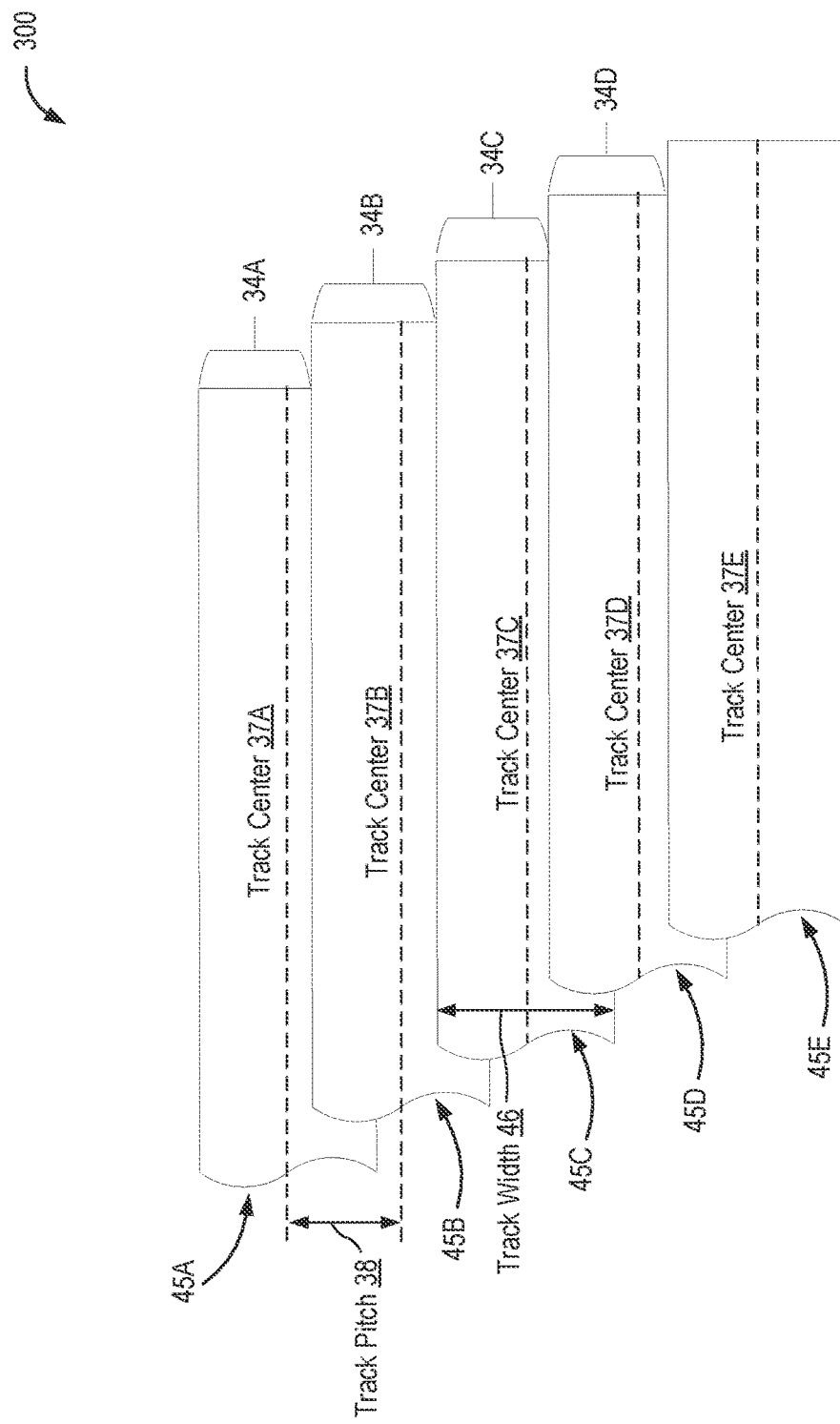
FIG. 3 shows an example of data tracks of a prior art disk format, where the data tracks are written using shingled magnetic recording (SMR).

FIG. 3 illustrates an example 300 of a plurality of data tracks 45 (e.g., data tracks 45A-45E) written in a shingled manner. Data tracks 45 may be similar or substantially similar to the data tracks described in relation to FIGS. 4A-4B. In some cases, the data track 45A (also referred to as data track N−1) having the track center 37A may be written first. Here, the track centers 37 (e.g., track center 37A-E) represent the nominal target of the write operation when data is being written to the respective tracks. Next, data track 45B associated with track center 37B is written. As seen, data track 45B overlaps at least a portion of the track width 46 of data track 45A, which is referred to as shingling. FIG. 3 shows the residual tracks after shingling as the shingled data tracks 34A-34D. While not shown, the center of the shingled data tracks 34 may be offset (e.g., up in the page) with respect to the corresponding track centers 37. In some cases, the center of a shingled data track 34 may be referred to as the read offset and may be used as the nominal read centerline while reading back a data track 45. In some cases, this read offset, which represents the nominal center of a data track after shingling, may pass through the center(s) of the data sectors along the data track. It should be noted that, the illustration in FIG. 3 is a conceptual idealized depiction of data tracks of a shingled disk. In practice, the track center(s) 37, data tracks 45, and/or shingled data tracks 34 may not follow straight and horizontal paths but may instead have a curved or wavy shape (e.g., as shown in FIGS. 4A-4B).

In some examples, an off-track write toward a previously recorded data track (e.g., data track N−1 or 45A), for instance, while writing to data track N, may corrupt the data previously recorded in data track N−1 rendering one or more data sectors unrecoverable. Typically, writing to a data track is aborted when an excessive off-track condition is detected (i.e., when the PES exceeds a write abort threshold) so as to minimize the amount of data corrupted in the adjacent data tracks. The data track density (e.g., tracks per inch or TPI) and write abort threshold are typically configured to ensure the recoverability of the data sectors in the adjacent data tracks. In some cases, the term "track squeeze" refers to a degree or an amount of corruption to the data sectors of a data track (e.g., data track 45A) due to interference during write operations on an adjacent data track (e.g., data track 45B). In accordance with one or more aspects of the present disclosure, the control circuitry 22 is configured to estimate the risk and/or the health of the data written to a prior track using one or more sector metrics. This enables the control circuitry 22 to continue writing to data track N, without assuming worst-case risk, as typically done in the prior art. As such, the present disclosure serves to reduce the number of aborts during subsequent write operations.

Figure 4A:
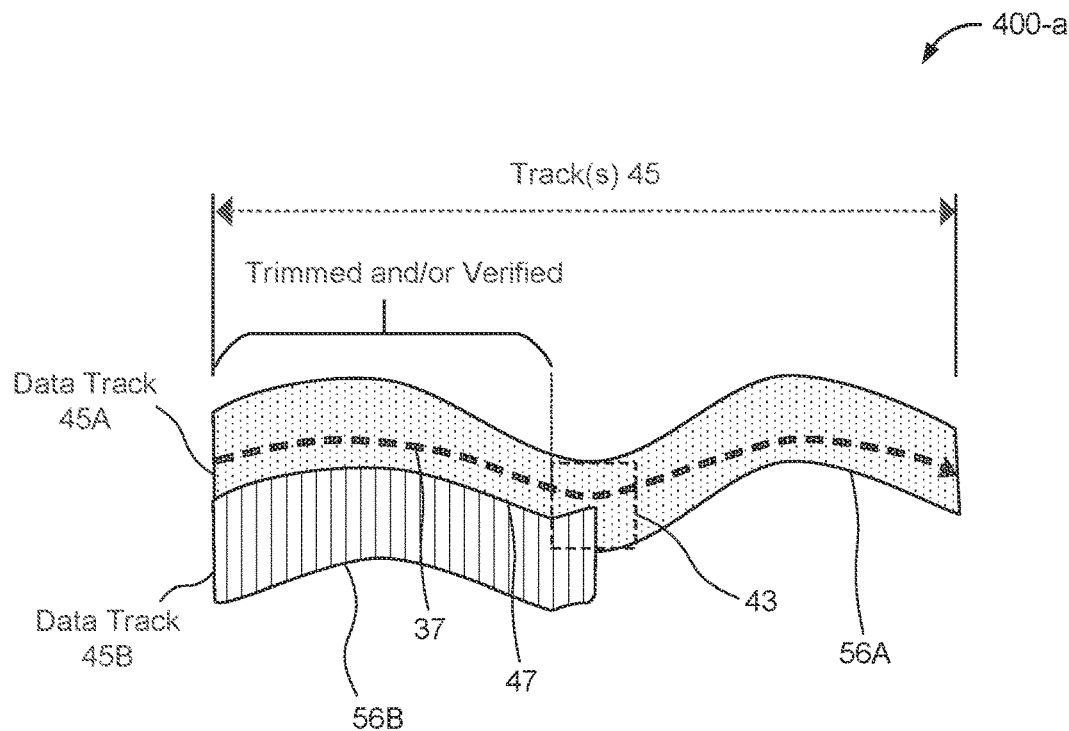
FIG. 4A shows an example of adjacent data tracks, where at least a portion of one of the tracks is partially squeezed due to the write on the adjacent data track, in accordance with aspects of the present disclosure.
Figure 4B:
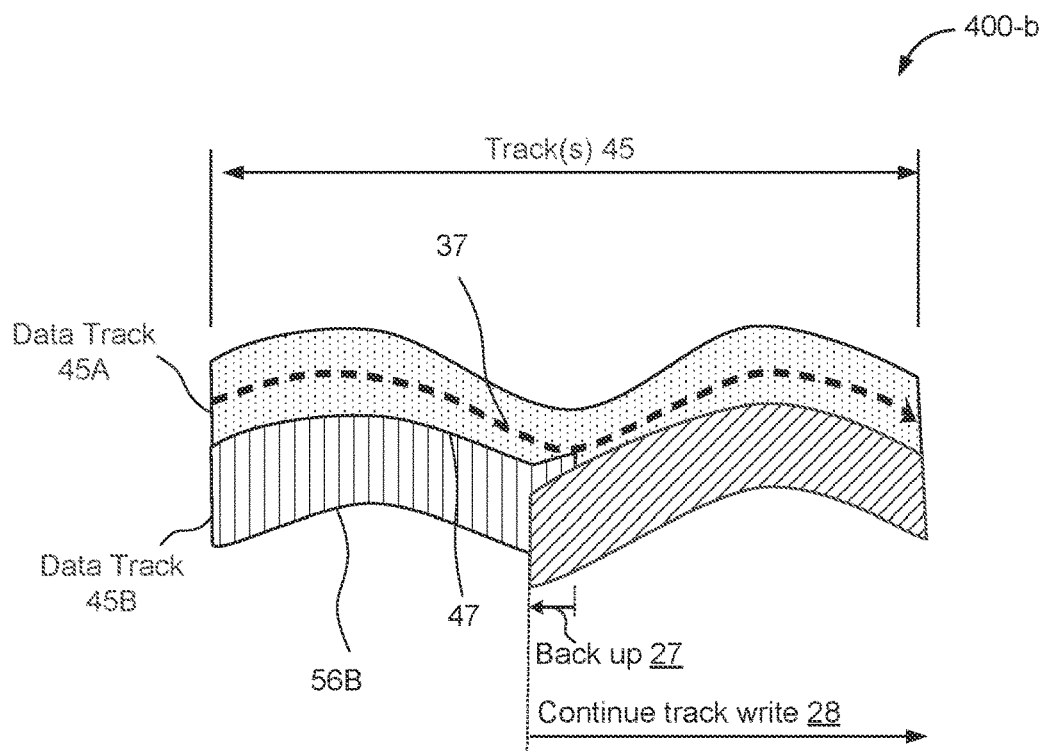
FIG. 4B shows an example of adjacent data tracks written using SMR, where the write on a current data track was aborted based on assessing a risk for a previous data track, in accordance with aspects of the present disclosure.

FIG. 4A shows an example 400-*a* of adjacent data tracks, including a trimmed edge, an open edge, and a track center of one of the data tracks, in accordance with aspects of the present disclosure. In this example, two previously written and adjacent or consecutive data tracks 45A (or data track N−1) and 45B (or data track N) are shown. Here, the data tracks 45A and 45B are written using SMR. The track center of the shingled data track 45A is shown as track center 37. Further, the shingled data track 45A comprises a trimmed edge 47 and an untrimmed edge 56A (also referred to as open edge 56A), where the trimmed edge 47 corresponds to an edge of data track 45A that has been trimmed as a result of writing data track 45B (N). In other words, data track 45A corresponds to a previously written data track having the track center 37. Further, data track 45B corresponds to a partially written data track that overlaps with a portion of the data track 45A. This overlapped portion or edge of data track 45A is shown as the trimmed edge 47, while the non-overlapping portion or edge of data track 45A is shown as the untrimmed/open edge 56A. Similarly, the untrimmed or open edge of data track 45B is shown as untrimmed/open edge 56B.

In some cases, a shingled track write of a data track N (45B) may infringe upon a previously written data track N−1 (45A), where the infringement exceeds a risk threshold criteria. Upon identifying such an infringement event (shown by 43), the control circuitry 22 may abort the write on data track N and record the event to memory (volatile or non-volatile memory). Prior to backing up and restarting the write of data to the data track N, a verify read to the data track N−1 may be performed. In some aspects, the verify read operation may help ensure that the data written on data track N−1 is not damaged beyond recovery capability. In this example, following verify read, the data track 45A may be represented by three segments: (1) a trimmed and/or verified portion (risk may be ignored), (2) a partially trimmed and verified portion (risk may be needed to continue the N data track write), shown by 43, and (3) an untrimmed portion 56A.

In some circumstances, if verify read fails, the data track N−1 is recovered with parity and the data track N−1 is re-queued to be relocated elsewhere on the disk surfaces. If the verify read passes, the risk for the trimmed and/or verified sectors is reset. After the verify read operation, the write path of data track N (45B) is reloaded to restart data write (shown as continue track write 28) at a backup location 27, as shown in the example 400-*b* in FIG. 4B. As an example, a first write trajectory or path used for writing data on the data track N may be reloaded, where the first write trajectory corresponds to a write trajectory prior to the write abort event. Next, the control circuitry 22 controls the actuator arm assembly to actuate a disk head over the backup location 27 by actuating the disk head along a write backup path on the data track N, and controls the actuator arm assembly to actuate the disk head from the backup location 27 along a second write trajectory for writing data to the data track N. In some cases, one or more write inhibit events may occur during the same track write. The control circuitry 22 is configured to repeat the above steps following each write inhibit event.

Additionally, or alternatively, after the control circuitry 22 performs read verify to determine whether it can adequately read the data stored in data track N−1, it may determine if there is a high risk of squeeze for the N−1 data track if it continues writing data to data track N. If so, the data stored in the N−1 data track (e.g., untrimmed portion) may be relocated to another portion of the disk drive. Relocating the data may comprise writing the data to another part of the disk, write caching it on the disk, write caching it in Random Access Memory (RAM), and/or write caching it on flash memory, to name a few non-limiting examples. In this way, the data storage device of the present disclosure serves to reduce latency while recovering one or more previously written data sectors. In some cases, track parity may be used to recover "unrecoverable" data sectors, such as data sectors that are associated with high risk/squeeze, as described below in relation to FIG. 8.

Figure 5:
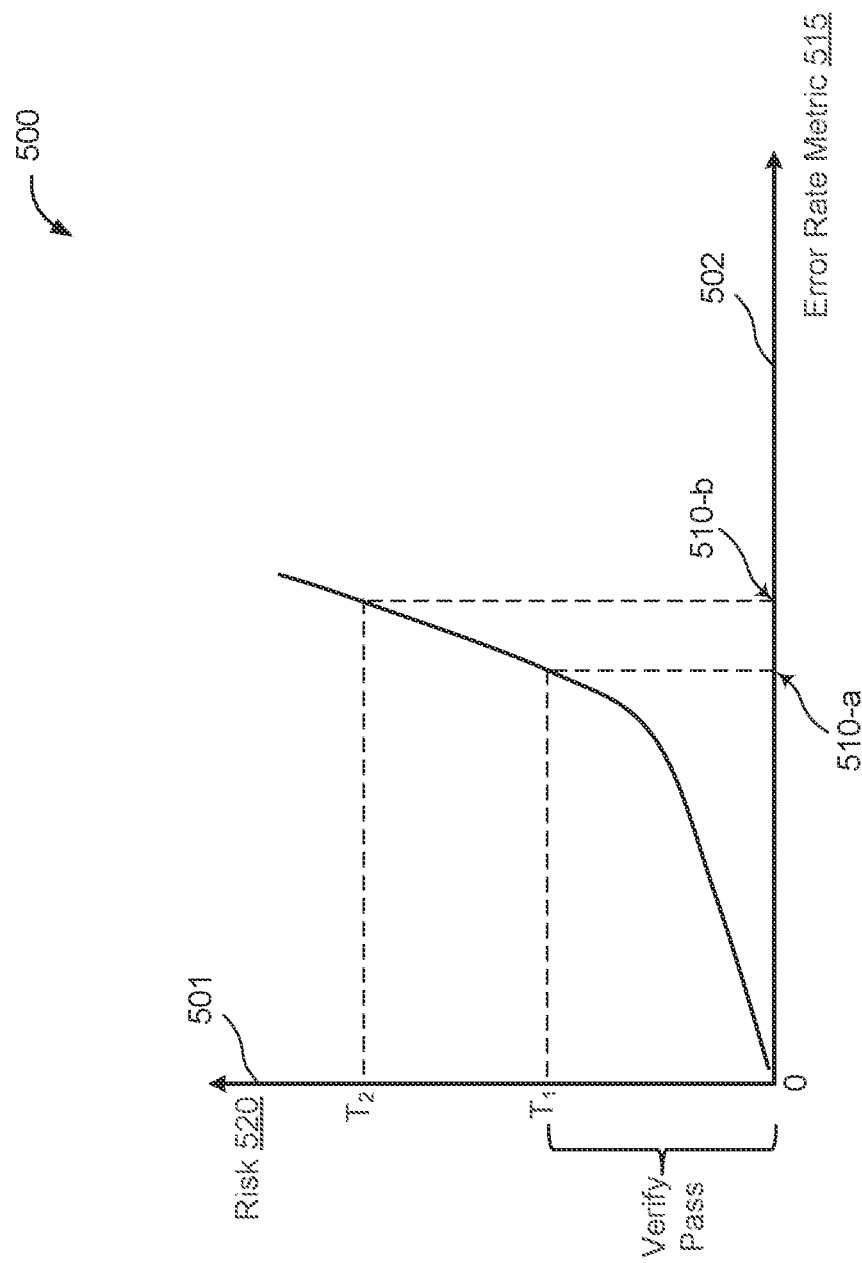
FIG. 5 illustrates an example graph of risk against an error rate metric, in accordance with aspects of the present disclosure.

FIG. 5 depicts a graph 500 showing risk 520 (on the vertical or y axis 501) against an error rate metric 515 (on the horizontal or x axis 502), according to various aspects of the disclosure. In some cases, the control circuitry 22 calculates an expected risk for a previously written data track N (45A) while writing data to a current data track N (45B). The expected risk may be calculated from the servo position error signal (PES) and may assume worst-case margins, such as an invisible PES margin. Typically, the expected risk calculated by the control circuitry 22 may be higher than the actual risk for the data track N−1. In some examples, the control circuitry 22 is configured to abort the write operation when the expected risk reaches an upper threshold ($T_2$)+an optional margin (for invisible PES). It should be noted that, the upper threshold ($T_2$) may be selected such that the control circuitry 22 or the disk drive is capable of fully recovering the data track N−1. The control circuitry 22 also utilizes a lower threshold ($T_1$), where the lower threshold is selected to allow "quick" readability, e.g., in a few milliseconds, of the data track N−1. As seen in FIG. 5, the error rate metric at the threshold ($T_1$) is error rate metric 510-*a*, and the error rate metric at the threshold ($T_2$) is error rate metric 510-*b*. In some cases, the lower threshold ($T_1$) is referred to as the relocation threshold, while the upper threshold ($T_2$) is referred to as the write abort threshold. Further, a data recovery procedure (DRP) margin may be accounted for as a result of the gap between the upper and lower thresholds $T_2$ and $T_1$. In some instances, when the error rate metric is at or below the error metric 510-*a* and the risk value is at or below the relocation threshold the data on the data track N−1 may be readable with read offset correction and/or shallow recovery. In such cases, the data sectors of the data track are said to pass verify. In the example shown in FIG. 5, the Y-axis is the actual risk (i.e., invisible PES margin is zero). Further, the control circuitry 22 makes the abort decision by comparing the perceived or estimated risk with respect to the threshold ($T_2$), and optionally, a margin (for invisible PES). That is, the write abort decision is based on comparing the estimated risk to the upper threshold ($T_2$)+the invisible PES margin. Since the invisible PES margin is unknown when the write abort occurs, an invisible PES margin=0 may correspond to the worst case. In such cases, the write abort happens when the actual risk 520 is equal to the upper threshold ($T_2$).

In some cases, the control circuitry 22 is configured to perform a verify process after a write inhibit or write abort event. In accordance with aspects of the disclosure, the control circuitry 22 measures the readability/recovery depth of one or more data sectors of a data track to determine whether the risk values for each of the data sectors is below the relocation threshold ($T_1$). If the data sectors pass verify, the control circuitry 22 resets the risk values for the fully trimmed data sectors. Additionally, or alternatively, the control circuitry 22 assumes (i.e., guesses or estimates) risk values for each of the one or more partially trimmed data sectors, including the data sectors in the write backup path 27, to continue the write operation on data track N (45B). In some circumstances, the risk values for these sectors (e.g., partially trimmed sectors, sectors in the write backup path 27) may be between 0 and $T_1$, and the actual values may or may not be known. In such cases, the control circuitry 22 assumes the risk values (if actual value is not known) for these sectors and accumulates to said risk values as it continues the write operation. In some circumstances, one or more data sectors of the data track 45A may not pass verify since their risk values are above the relocation threshold $T_1$, for instance, between $T_1$ and $T_2$. In such cases, the control circuitry relocates at least a portion of (e.g., the data sectors that did not pass verify), or alternatively, the entire data track N−1 (45A). It should be noted that, the relocation and write abort thresholds $T_1$ and $T_2$, respectively, are exemplary only and not intended to be limiting. In some cases, the control circuitry 22 may compare the estimated risk to one or more additional thresholds related to readability (e.g., quick readability, full recovery, and/or anything in between) while determining whether a write operation should be aborted. Further, the collected sector metrics 515 may be retained in memory (e.g., volatile memory, such as DRAM; non-volatile memory, such as flash memory) and used for scheduling/queuing and/or processing subsequent read operations.

Thus, aspects of the present disclosure prevent the disk drive from falsely raising the overall risk of the data track, as compared to the prior art, by using the sector metrics (e.g., an error rate metric, such as a bit error rate or BER) for estimating the true risk values of the partially trimmed data sectors and/or the data sectors in the write backup path 27. In some examples, the sector metrics may be collected during the verify process. In this way, the control circuitry 22 may not need to assume the worst-case risk (e.g., $T_2$ threshold) for the partially trimmed data sectors and/or the data sectors in the write backup path. As noted above, assumption of worst-case risk may increase the probability of a second abort, e.g., on the current track, by falsely raising the overall risk of a previous data track.

In some examples, the control circuitry 22 performs a verify operation when it detects a write inhibit/abort event, where the verify operation comprises reading the shingled data track N−1 (45A) with or without track parity. In case of track parity, the pre-track parity error rate may be computed using the decoded bit sequence. Additionally, or alternatively, the data track N−1 may be read one or more times, for instance, using one or more of a constant read offset and non-constant read offsets. In some examples, additional recovery steps may be used during the read verify operation, some non-limiting examples include averaging or combining waveform samples from multiple reads for multiple data sectors. It should be noted that, one or more of the write verify operations described herein may be optional.

If a data sector is readable, the bit error rate or another sector metric (e.g., number of parity equation errors, log-likelihood ratio (LLR), and/or any other applicable SNR metric) may be calculated. In some embodiments, the bit error rate (or another sector metric) may be calculated at the Soft Output Viterbi Algorithm (SOVA) stage, i.e., before using a track error correction code (ECC). In some cases, one or more verify read operations may be performed using different read offsets, different track parity, etc., to determine if the data sectors are readable. Further, one or more readable data sectors may be included in subsequent verify reads. In some examples, for second and subsequent instances of the same sector being readable, the minimum error rate metric (e.g., BER, or another sector metric, such as LLR, MSE) measured so far, may be selected as the error rate metric (e.g., BER) for that sector. In some cases, if there is at least one non-readable sector at the end of the verify process, the data track may be relocated to another location on the disk surface. In such cases, the control circuitry 22 may abort the estimation of risk.

In accordance with aspects of the disclosure, the one or more sector metrics (e.g., BER) collected may be mapped to corresponding risk values. While not necessary, in some examples, a fixed mapping may be used for mapping the collected sector metrics to risk values. In the example shown in FIG. 5, when the error rate metric is above the error rate metric 510-$a$ (i.e., corresponding to the $T_1$ risk threshold), the data sector(s) may not converge and risk estimation may be unreliable, as depicted by the exponential slope of the curve.

Figure 6:
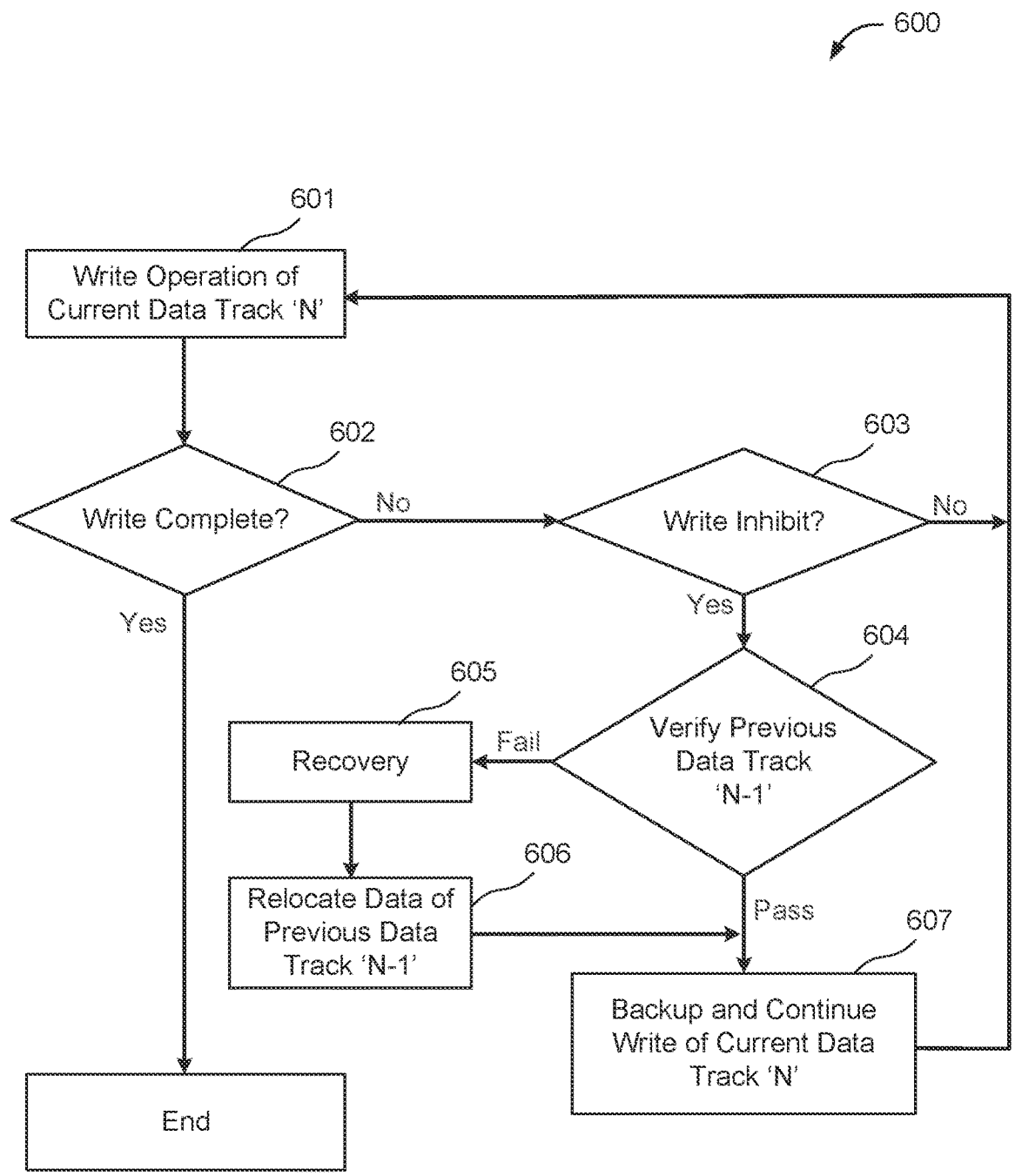
FIG. 6 illustrates an example of a method for verifying the integrity of a previously written data track following a write abort event while writing a current data track, in accordance with aspects of the present disclosure.

FIG. 6 illustrates an example of a method 600 for verifying the integrity of a previously written data track N−1 following identifying a write abort event while writing a current data track N, according to various aspects of the disclosure. Method 600 may be implemented using the control circuitry 22. At step 601, the method 600 comprises performing a write operation, where the write operation comprises writing data on a data track N (e.g., data track 45B). At step 602, the method 600 comprises determining if the write is complete. If the write is not complete, the method comprises determining if a write inhibit event occurred (step 603). If yes, at step 604, the control circuitry 22 proceeds to verify the N−1 track (e.g., data track 45A). For instance, the control circuitry 22 controls the actuator arm assembly to seek to the previously written track N−1, following which it proceeds to perform read verify on the data track. In some examples, the servo or the control circuitry 22 estimates the risk on a previously written data track as it is writing data on a current data track. Further, writing is aborted based on assessing the risk and determining that said risk exceeds a pre-defined threshold criteria. As noted above, in some circumstances, the estimated risk provided by the servo may be inaccurate or too "conservative". According to aspects of the disclosure, the control circuitry 22 computes a more accurate value of the risk based on the output of the verify read operation (i.e., rather than relying on the risk estimated from the servo) and updates the risk value to be used as the N data track write operation continues. In some cases, a lookup table, lookup function, or another applicable data structure corresponding to a mapping of the risk to a sector metric (e.g., BER) may be used, as described above in relation to FIG. 5.

If the read verify for the N−1 data track fails, the control circuitry 22 proceeds to data recovery for the N−1 data track (step 605) and relocating the N−1 data track (step 606). In other cases, if the N−1 data track verify operation at step 604 passes, the write head is backed up a pre-defined distance (shown as back-up 27 in FIG. 4B) along the N data track and the write operation resumes (step 607).

Figure 7:
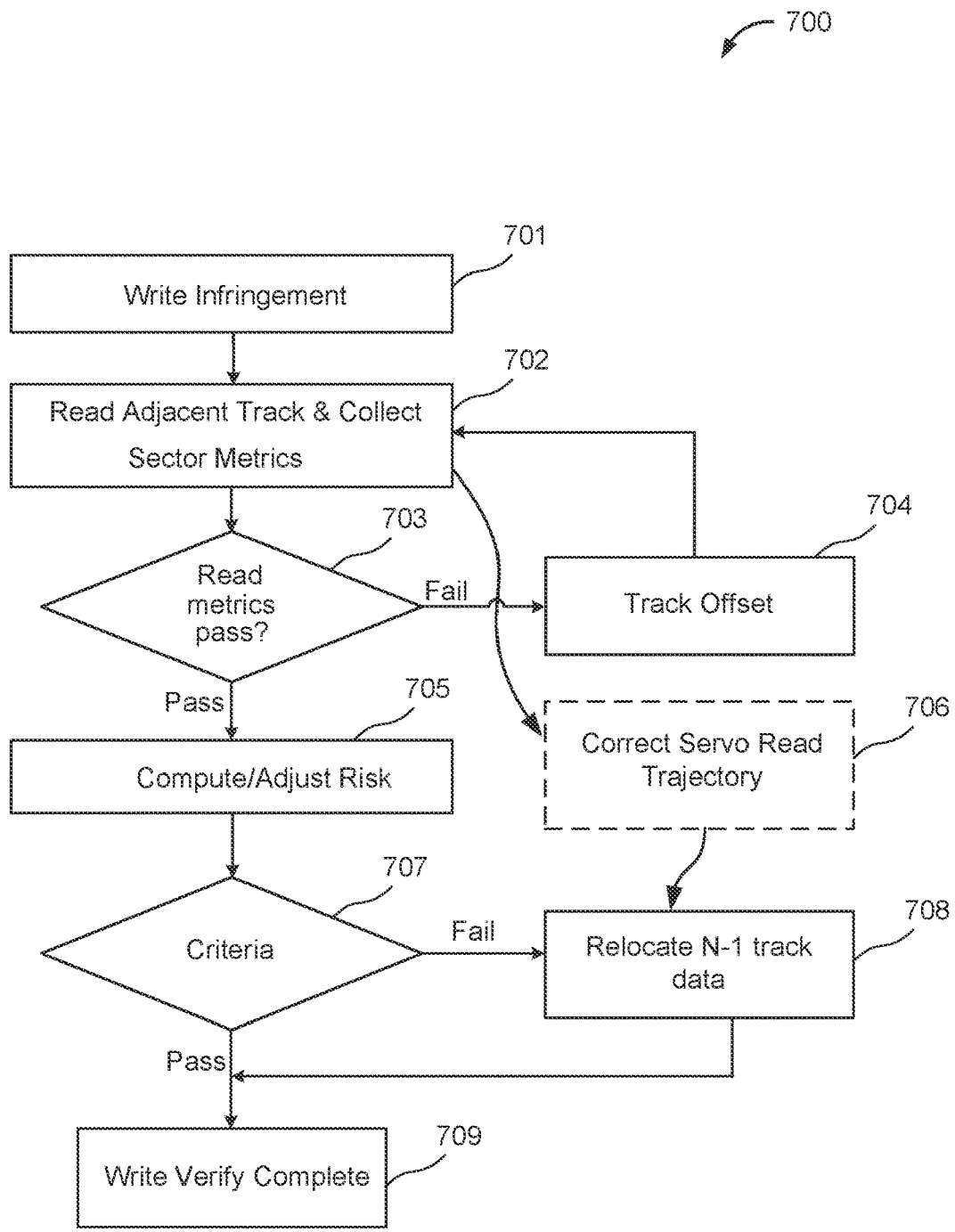
FIG. 7 illustrate an example of a method for performing a write verify operation, in accordance with aspects of the present disclosure.

FIG. 7 illustrates an example of a method 700, according to various aspects of the disclosure. Method 700 may be implemented using the control circuitry 22. At step 701, the method 700 comprises detecting a write infringement while writing on a current data track N. For instance, the servo may detect that the write position of the current data track write has squeezed a previously written data track N−1. In such cases, the control circuitry 22 proceeds to perform write verify to assess the damage (if any) to the N−1 track data. As shown, at step 702, the method comprises reading the N−1 data track and collecting one or more corresponding sector metrics. In some cases, the reading comprises an initial read, and optionally, one or more re-reads of the one or more sectors. At step 703, the sector metrics read are evaluated with respect to a threshold. If the sector metrics (e.g., BER, SNR) pass, an updated risk value is computed, and the existing risk is adjusted at step 705, as previously described in relation to FIG. 5. In some embodiments, the risk value(s) for the fully trimmed and/or verified sectors is reset (i.e., fully trimmed sectors may not need a risk value since their risk cannot be accumulated or added to in SMR). Further, the risk value(s) for the partially trimmed and verified sectors, or sectors in the back-up 27 path, may be updated based on the sector metrics collected during the verify process. In case of a fail, the N−1 track may be re-read at a plurality of read offsets (steps 704 and 702). In some examples, the control circuitry 22 maps the one or more sector metrics to one or more risk values, where the one or more sector metrics comprise one or more of bit errors or a bit error rate (BER), sector failure rate, mean squared error (MSE), parity equation errors, log-likelihood ratio (LLR), squeeze loss, and a signal to noise ratio (SNR) metric. Further, the control circuitry 22 accumulates a track risk (using the risk values for the partially trimmed and verified sectors) for the data track N−1 based on the mapping.

In some examples, a new servo read trajectory is determined at step 706, for instance, based on the sector metrics read at different read offsets. In some cases, the measurement of the sector metrics within the verify operation, e.g., using the offset re-reads at ±5%, ±7.5%, ±10% of track pitch 38, etc., may be used to estimate the reliability, as well as the residual center position, for the data sectors along the length of the N−1 data track. The residual center position of the data sectors may be used to determine a new servo read positioning trajectory, which may help enhance error recovery.

At step 708, the method 700 comprises recovering the N−1 track's data using a data recovery procedure (DRP) and relocating the track's data to another location on the disk surface before continuing the current track write (step 709). Relocating the data may comprise writing the data to another part of the disk, write caching it on the disk, write caching it in Random Access Memory (RAM), and/or write caching it on non-volatile memory, such as flash memory, to name a few non-limiting examples. In some circumstances, the N−1 track's data may be recovered using one or more read offsets, parity correction (e.g., by reading one or more parity sectors), or a combination thereof. Further, the N−1 track's data may be cached until the write operation is completed, which may be the current write operation for data track N or a future write operation (e.g., for track N+1, N+2, etc.). In some aspects, retention of the N−1 track data to cache memory may help minimize recovery latency, for instance, if successive write events on the data track N induce additional damage on the prior track. In some cases, after computing and adjusting the risk at step 705, the method comprises assessing the risk with respect to a threshold criteria (step 707) and proceeding to one of steps 708 and 709. At step 709, the verify is complete and the control circuitry 22 continues the N track write. In some examples, adjusting the risk comprises increasing or decreasing the risk value.

FIG. 8A illustrates an example 800-a showing a track 45 having track parity, such as a parity sector 811, at the end of the track, according to various aspects of the disclosure. In some examples, track parity comprises a bit-wise Exclusive Or (XOR 827) of all encoded sectors of the data track 45. For example, bit 0 of a sector 821 may be XOR'd with bit 0 of the next sector 821, and so on, and stored as a parity sector 811 at the end of the track.

FIG. 8B illustrates an example 800-b showing a track 45 comprising a distributed sector (DSEC) block 843 and track parity (e.g., one or more parity sectors) at the end of the track 45. The plurality of parity sectors 831 may be generated on interleave, where each parity sector 831 is generated from an XOR logical operation, where the XOR 827 uses modulo N (e.g., N=4) sectors along the track. In this example, each parity sector is generated from an XOR of multiple sectors (e.g., every $4^{th}$ or $n^{th}$ sector) along the track 45. In some instances, these parity sectors 831 may be referred to as "interleaved parity sectors".

In some examples, the control circuitry 22 performs on the fly (OTF) correction using one or more of the DSEC block 843 and the interleaved parity sectors. In some cases, the interleaved parity sectors may help correct for longer TMR events. In this example, the track parity or parity sector 830 comprises four (4) interleaved parity sectors 831 and DRP may allow for up to 4 sector erasures. It should be noted that, the number of interleaved parity sectors is not intended to be limiting. Accordingly, the number of sector erasures permitted may also vary in different implementations. For instance, FIG. 8C illustrates an example 800-c where eight (8) interleaved parity sectors 839 at the end of the track 45 are used for DRP. As seen, FIG. 8C shows a track 45 subdivided into a plurality of logical sub-tracks 65, for instance, four (4) logical sub-tracks. In some cases, sub-track parity may be implemented by a bit-wise XOR of a sub-track's encoded sectors. This results in a sub-track parity sector 841 at the end of each quarter section of the track 45. Further, a parity sector 832 having a plurality of interleaved track parity sectors 839 may be appended to the end of track 45. In this example, the parity sector 832 comprises eight (8) interleaved track parity sectors 839, where each parity sector 839 is generated from an XOR logical operation of modulo 8 sectors along the track.

In some circumstances, this parity sector 832 may also be used for correction, i.e., in addition to or in lieu of the sub-track parity sectors 841. For instance, if a sub-track parity sector 841 between adjacent logical sub-tracks 65 is unable to adequately correct the data, the interleaved track parity at the end of track 45 may serve as an added source of correction. In some aspects, the use of parity sectors between adjacent sections (e.g., quarter sections) of a data track, in addition to the interleaved parity sectors (e.g., 4 or 8 interleaved track parity) at the end of the track, may help dispense errors and enhance their correctability. While not necessary, in some examples, each of the logical sub-tracks may be associated with one or more distributed sectors or DSECs (shown as DSEC 843 in FIG. 8B).

In some cases, multiple data sectors may be distributed as a block code across a plurality of physical sectors (e.g., 15, 16, 17 physical sectors) and referred to as a distributed sector (DSEC). In some aspects, DSECs may help average the SNR in a manner that facilitates a higher TPI by limiting the squeeze loss to an individual logical sector (i.e., as opposed to the physical sectors written on a disk). In other words, by permutating and distributing sectors across a larger block (or DSEC), the SNR distribution may be narrowed/tightened and shifted, which helps increase areal density, TPI, etc., of the disk drive. Some non-limiting examples of SNR metrics include a bit error rate (BER), sector failure rate, MSE, log-likelihood ratio (LLR), parity equation errors, or 2T, 3T preamble SNR. As noted above, these SNR metrics may be used to estimate the positions of previously written sectors along the data track (e.g., data track N−1 or 45A). Additionally, or alternatively, the SNR metrics may be mapped to a risk metric, where the risk metric indicates the level of squeeze per sector of a data track. In some examples, multiple measurements at different read offsets may be used to construct an overall sector metric that includes information from all the reads. This overall sector metric may reflect, for example, (1) the best SNR/BER/LLR, etc., on a data track (2) the range of read offsets where the SNR/BER/LLR is at or above a threshold, or a combination thereof.

Figure 9:
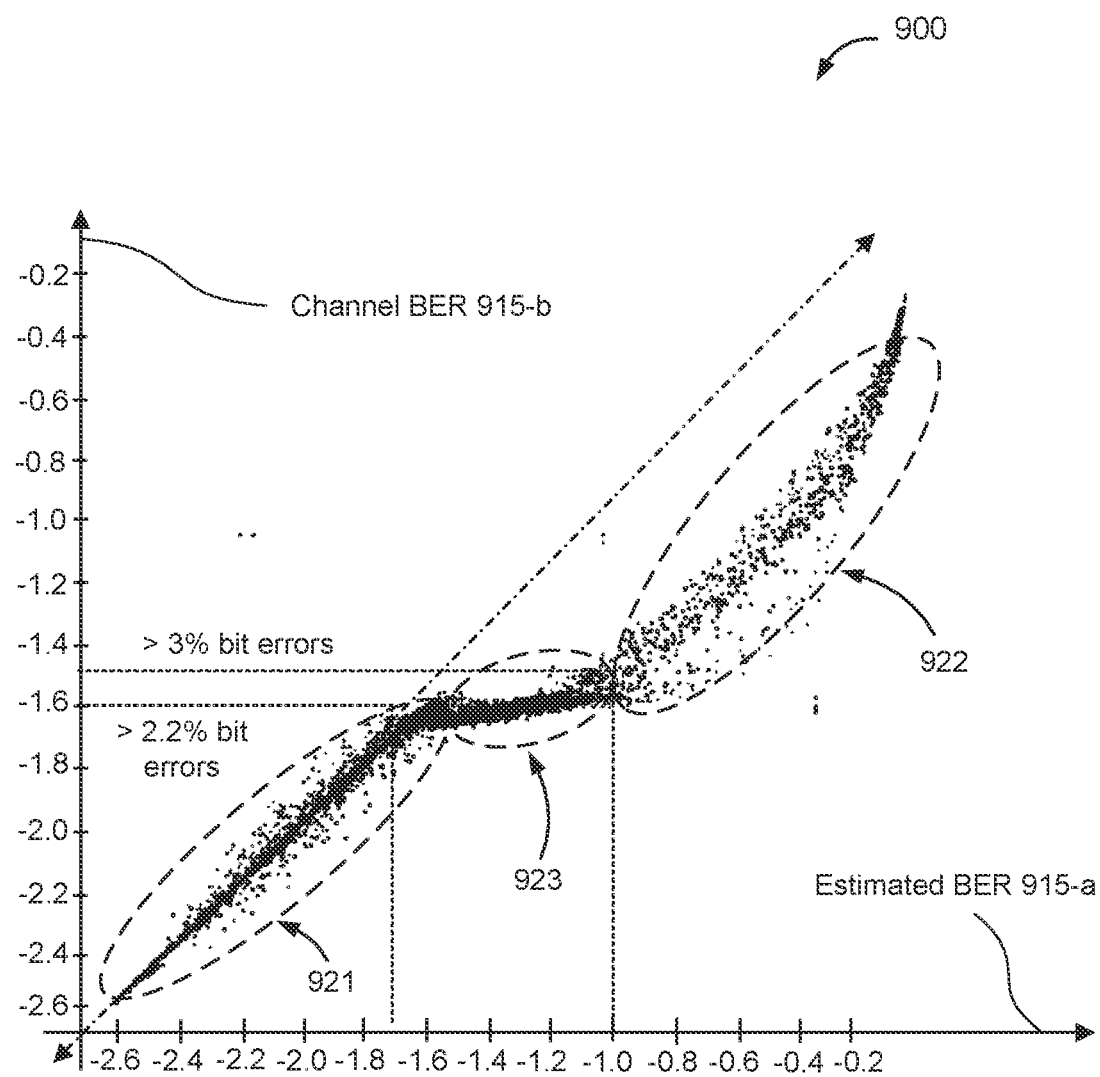
FIG. 9 illustrates an example graph of initial sector metrics against an adjusted bit error rate for computing or adjusting risk following a write inhibit event, in accordance with aspects of the present disclosure.

FIG. 9 illustrates a conceptual graph 900 showing reconstructed sector metrics (e.g., channel BER 915-b) on the vertical or y-axis against estimated BER 915-a on the horizontal or x-axis. In some examples, when a write inhibit occurs and a verify operation is performed, the control circuitry 22 receives the BER, or another sector metric, of each physical sector. In one non-limiting example, the channel BER 915-b may be received from the low-density parity check (LDPC) decoder's hard decisions. In accordance with various aspects of the disclosure, the control circuitry 22 is configured to estimate the quality or degradation in each sector with parity applied. Parity sectors, such as those described in relation to FIGS. 8A-C, may be used to form sector metrics. In some cases, a parity sector may help determine the correct bits. By comparing the correct bits determined by the parity sector to the incorrect bits read (e.g., by reading a sector in the verify operation), a sector metric, such as bit error rate, may be determined.

In some examples, the channel BER received from the LDPC decoder may be adjusted to determine the degree of degradation for a read as each sector is being decoded. Said another way, the BER or other sector metrics read from the channel, shown on the y-axis, may be used to generate a lookup table or a linear fit, which is then used to estimate the original BER corresponding to the x-axis. In the example shown, the sector metrics or BER received from the channel are used to estimate the quality of the written data. In FIG. 9, three linear fit regions (e.g., converged 921, not converged 922, and nearly converged 923) are used to characterize the sector metric measurements (e.g., channel BER). When a sector converges, the number of bit errors, as well as the quality, may be known. In this example, when the sector metric on the y-axis is at or below −1.6, the LDPC is converged and the BER is less than 2.2%. In the nearly converged 923 region, the channel BER ranges from about −1.6 to −1.5 and the estimated BER ranges from about −1.7 to −1. Further, in this example, the nearly converged region 923 corresponds to a bit error rate between 2.2% and 3%. Lastly, the number of bit errors in the non-converged region 922 exceed 3%. It should be noted that, the percentages, scales (e.g., log of probability on the x and y-axis), etc., described herein are exemplary only and not intended to be limiting. Different lookup table(s) or linear fit regions are contemplated in different embodiments, for instance, based on the type of decoder (e.g., LDPC decoder) being used, to name one non-limiting example.

In the non-converged 922 and/or nearly converged regions 923, the quality may be inferred from the estimated bit count. In some cases, the final bit sequence computed from the verify operation may be compared to the initial Soft Output Viterbi Algorithm (SOVA) hard decisions (e.g., received from the LDPC decoder) to obtain the number of bits flipped. In some cases, the error rate for the data sectors corresponding to the non-converged 922 or nearly converged 923 regions may be estimated from the bits that were flipped even though the LDPC does not converge. Further, the estimated BER (corresponding to the intercept on the x-axis) may be used to re-estimate risk values for DSECs, which enables the control circuitry 22 to account for the servo invisible positioning error (also referred to as invisible PES) as it continues writing data.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example, they are fabricated into a single integrated circuit or system on a chip (SoC). In addition, the control circuitry may include a preamp circuit implemented as a separate integrated circuit, integrated into the read channel or data storage controller circuit, or integrated into an SoC.

In some examples, the control circuitry comprises a microprocessor executing instructions, the instructions being operable to cause the microprocessor to perform the flow diagrams described herein. The instructions may be stored in any computer-readable medium. In some examples, they may be stored on a non-volatile semiconductor memory device, component, or system external to the microprocessor, or integrated with the microprocessor in an SoC. In some examples, the instructions are stored on the disk and read into a volatile semiconductor memory when the disk drive is powered on. In some examples, the control circuitry comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, or other one or more processing devices performing one or more of the functions of control circuitry as described herein, may be part of or proximate to a rack of or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. In addition, some examples may include electronic devices such as computing devices, data server devices, media content storage devices, or other devices, components, or systems that may comprise the storage media and/or control circuitry as described above.

The various features and processes described above may be used independently of one another or may be combined in various ways. All possible combinations and sub combinations are intended to fall within the scope of this disclosure. In addition, certain method, event or process blocks may be omitted in some implementations. The methods and processes described herein are also not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 may be performed by or embodied in hardware, and/or performed or executed by a controller, a CPU, an FPGA, a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for estimating health of written data using one or more sector metrics for data storage, and other aspects of this disclosure. Persons skilled in the relevant fields of art will be well-equipped by this disclosure with an understanding and an informed reduction to practice of a wide panoply of further applications, architectures, techniques, and methods for estimating health of written data using one or more sector metrics for data storage, and other aspects of this disclosure encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device comprising:
   a disk comprising a plurality of data tracks, including at least a data track N and a data track N−1;
   a head actuated over the disk; and
   one or more processing devices configured to:
   identify, during a track write on the data track N, a write abort event;
   read one or more sectors of the data track N−1, wherein the reading comprises collecting one or more sector metrics for the one or more sectors;
   estimate a health metric of each of the one or more sectors by determining if the one or more sector metrics is within a range below a first risk threshold and above a second risk threshold; and
   assigning each of the one or more sectors as a readable sector or a non-readable sector based upon the health metric of each of the one or more sectors.

2. The data storage device of claim 1, wherein the one or more processing devices are further configured to continue the track write on the data track N upon: (1) determining each of the one or more sectors is a readable sector, or (2) recovering the data track N−1 and relocating the data track N−1 based on determining at least one of the one or more sectors is a nonreadable sector.

3. The data storage device of claim 1, wherein the reading comprises an initial read and one or more re-reads of each of the one or more sectors, and wherein the one or more processing devices are further configured to:
   calculate, for each of the one or more readable sectors, a corresponding error rate metric, wherein the error rate metric is calculated for the initial read and each of the one or more re-reads.

4. The data storage device of claim 3, wherein the one or more processing devices are further configured to:
   determine, based upon the initial read and the one or more re-reads, a minimum error rate metric for each of the one or more readable sectors;
   assign, to each of the one or more readable sectors, the corresponding minimum error rate metric; and
   reset a risk value for each of the one or more readable sectors.

5. The data storage device of claim 1, wherein the one or more processing devices are further configured to:
   map the one or more sector metrics to one or more risk values, wherein the one or more sector metrics comprise one or more of bit errors or a bit error rate (BER), sector failure rate, mean squared error (MSE), parity equation errors, log-likelihood ratio (LLR), squeeze loss, and a signal to noise ratio (SNR) metric; and
   accumulate, for the data track N−1, a track risk based on the mapping.

6. The data storage device of claim 1, further comprising:
   an actuator arm assembly comprising one or more disk heads and a voice coil motor (VCM); and
   wherein the one or more processing devices are further configured to:
   control the actuator arm assembly to actuate the one or more disk heads over a disk surface of the disk.

7. The data storage device of claim 6, wherein the one or more processing devices are further configured to continue the track write on the data track N, and wherein continuing, by the one or more processing devices, the track write on data track N, comprises:
   reloading a first write trajectory used for writing data on the data track N, the first write trajectory corresponding to a write trajectory prior to the write abort event;
   controlling the actuator arm assembly to actuate a disk head over a backup location by actuating the disk head along a write backup path on the data track N; and
   controlling the actuator arm assembly to actuate the disk head from the backup location along a second write trajectory for writing data to the data track N.

8. The data storage device of claim 7, wherein each of the one or more readable sectors is selected from a group consisting of a fully trimmed sector, a partially trimmed sector, and a sector in the write backup path, and wherein, prior to continuing the track write on data track N, the one or more processing devices are further configured to:
   estimate, for each of the partially trimmed sectors and sectors in the write backup path, a risk value.

9. The data storage device of claim 1, wherein the one or more processing devices are further configured to:
   accumulate, during the track write on the data track N, a risk metric for the data track N−1, the risk metric comprising a squeeze loss of the data track N−1, and wherein the risk metric is based at least in part on a servo write position error signal (PES) associated with the track write.

10. The data storage device of claim 1, wherein the data track N−1 is a partially squeezed shingled magnetic recording (SMR) track, and wherein at least one of the one or more sectors is a partially trimmed sector, and wherein the one or more processing devices are further configured to:
estimate, for the partially trimmed sector, a risk value based at least in part on a corresponding sector metric;
replace, based on determining that the risk value is below a relocation threshold, an expected risk with the estimated risk value; and
adjust the risk value while continuing the track write on the data track N, wherein the adjusting comprises increasing or decreasing the risk value.

11. The data storage device of claim 1, wherein the health metric is an estimation of a degree of degradation.

12. A data storage device comprising:
a disk comprising a plurality of data tracks, including at least a data track N and a data track N−1;
a head actuated over the disk; and
one or more processing devices configured to:
identify, during a track write on the data track N, a write abort event;
read one or more sectors of the data track N−1, wherein the reading comprises collecting one or more sector metrics for the one or more sectors;
verify each of the one or more sectors based upon the one or more sector metrics;
assigning each of the one or more sectors as a readable sector or a non-readable sector; and wherein the one or more processing devices are further configured to:
read the data track N−1 with track parity, wherein reading the data track N−1 with track parity comprises using at least one decoded bit sequence to compute an error rate prior to applying said track parity.

13. The data storage device of claim 12, wherein, reading the data track N−1 comprises a plurality of reads of the data track N−1, and wherein, for each of the plurality of reads, the one or more processing devices are further configured to:
read the data track N−1 using a constant read offset or non-constant read offsets.

14. A data storage device comprising:
a disk comprising a plurality of data tracks, including at least a data track N and a data track N−1;
a head actuated over the disk; and
one or more processing devices configured to:
identify, during a track write on the data track N, a write abort event;
read one or more sectors of the data track N−1, wherein the reading comprises collecting one or more sector metrics for the one or more sectors;
verify each of the one or more sectors based upon the one or more sector metrics; assigning each of the one or more sectors as a readable sector or a non-readable sector; and
wherein the one or more processing devices are further configured to:
retain the one or more collected sector metrics for one or more of:
scheduling a read of at least another one of the plurality of data tracks, and
processing a read of at least another one of the plurality of data tracks.

15. A method of operating a data storage device, comprising:
identifying, during a track write on a data track N, a write abort event based upon an expected risk for a data track N−1 exceeding a first risk threshold;
reading the data track N−1, wherein the reading comprises reading one or more sectors of the data track N−1 and collecting one or more sector metrics for the one or more sectors;
estimating a health metric of each of the one or more sectors by determining if the one or more sector metrics is within a range below the first risk threshold and above a second risk threshold;
assigning each of the one or more sectors as one of a readable sector or a non-readable sector based on the health metric of each of the one or more sectors; and
continuing the track write on the data track N upon: (1) determining each of the one or more sectors is a readable sector, or (2) recovering the data track N−1 and relocating the data track N−1 based on determining at least one of the one or more sectors is a non-readable sector.

16. The method of claim 15, wherein the data tracks N−1 and N are written using shingled magnetic recording (SMR), and wherein the data tracks N−1 and N are adjacent or consecutive data tracks.

17. The method of claim 15, wherein the reading comprises an initial read and one or more re-reads of each of the one or more sectors, and wherein the method further comprises:
calculating, for each of the one or more readable sectors, a corresponding error rate metric, wherein the error rate metric is calculated for the initial read and each of the one or more re-reads.

18. The method of claim 17, further comprising:
determining, based upon the initial read and the one or more re-reads, a minimum error rate metric for each of the one or more readable sectors;
assigning, to each of the one or more readable sectors, the corresponding minimum error rate metric; and
resetting a risk value for each of the one or more readable sectors.

19. The method of claim 15, further comprising:
mapping the one or more sector metrics to one or more risk values, wherein the one or more sector metrics comprise one or more of bit errors or a bit error rate (BER), sector failure rate, mean squared error (MSE), parity equation errors, log-likelihood ratio (LLR), squeeze loss, and a signal to noise ratio (SNR) metric; and
accumulating, for the data track N−1, a track risk based on the mapping.

20. The method of claim 15, wherein continuing the track write on data track N, comprises:
reloading a first write trajectory used for writing data on the data track N, the first write trajectory corresponding to a write trajectory prior to the write abort event;
controlling an actuator arm assembly to actuate a disk head over a backup location by actuating the disk head along a write backup path on the data track N; and
controlling the actuator arm assembly to actuate the disk head from the backup location along a second write trajectory for writing data to the data track N.

21. The method of claim 15, wherein estimating a health metric of each of the one or more sectors is estimating a degree of degradation of each of the one or more sectors.

22. One or more processing devices, comprising:
- means for identifying, during a track write on a data track N, a write abort event based upon an expected risk for a data track N−1 exceeding a first risk threshold;
- means for reading the data track N−1, wherein the reading comprises reading one or more sectors of the data track N−1 and collecting one or more sector metrics for the one or more sectors;
- means for estimating a health metric of each of the one or more sectors by determining if the one or more sector metrics is within a range below the first risk threshold and above a second risk threshold, wherein the estimating comprises assigning each of the one or more sectors as one of a readable sector or a non-readable sector based upon the health metric of each of the one or more sectors; and
- means for continuing the track write on the data track N upon: (1) determining each of the one or more sectors is a readable sector, or (2) recovering the data track N−1 and relocating the data track N−1 based on determining at least one of the one or more sectors is a non-readable sector.

\* \* \* \* \*